US008954355B2

(12) United States Patent
Whitehouse et al.

(10) Patent No.: US 8,954,355 B2
(45) Date of Patent: Feb. 10, 2015

(54) INTEGRATED POSTAGE AND SHIPPING LABEL SYSTEM

(75) Inventors: Harry T. Whitehouse, Portolo Valley, CA (US); Amine G. Khechfe, Cupertino, CA (US)

(73) Assignee: PSI Systems, Inc., Palo Alto, CA (US)

( * ) Notice: Subject to any disclaimer, the term of this patent is extended or adjusted under 35 U.S.C. 154(b) by 780 days.

(21) Appl. No.: 11/341,273

(22) Filed: Jan. 26, 2006

(65) Prior Publication Data
US 2007/0174213 A1 Jul. 26, 2007

(51) Int. Cl.
G07B 17/02 (2006.01)
G07B 17/00 (2006.01)
G06Q 30/02 (2012.01)

(52) U.S. Cl.
CPC .......... *G07B 17/00016* (2013.01); *G06Q 30/02* (2013.01); *G07B 2017/00056* (2013.01); *G07B 2017/00064* (2013.01); *G07B 2017/00145* (2013.01); *G07B 2017/0062* (2013.01)
USPC ....................................................... 705/401

(58) Field of Classification Search
USPC .......... 705/1, 409, 404, 401; 235/381; 283/81
See application file for complete search history.

(56) References Cited

U.S. PATENT DOCUMENTS

| 5,319,562 | A | 6/1994 | Whitehouse |
| 6,005,945 | A | 12/1999 | Whitehouse |
| 6,381,590 | B1 * | 4/2002 | Debois .............................. 705/61 |
| 7,103,583 | B1 * | 9/2006 | Baum et al. .................... 705/409 |
| 7,236,970 | B1 * | 6/2007 | Winslow ............................... 1/1 |
| 7,243,842 | B1 * | 7/2007 | Leon et al. ..................... 235/381 |
| 7,458,612 | B1 * | 12/2008 | Bennett ............................ 283/81 |
| 2002/0032573 | A1 * | 3/2002 | Williams et al. .................... 705/1 |
| 2002/0082935 | A1 * | 6/2002 | Moore et al. ....................... 705/26 |
| 2002/0143714 | A1 * | 10/2002 | Allport et al. ................... 705/401 |
| 2002/0165729 | A1 * | 11/2002 | Kuebert et al. .................... 705/1 |
| 2003/0101143 | A1 | 5/2003 | Montgomery et al. |
| 2003/0101148 | A1 * | 5/2003 | Montgomery et al. ........ 705/404 |
| 2003/0217017 | A1 * | 11/2003 | Willoughby et al. .......... 705/404 |

(Continued)

FOREIGN PATENT DOCUMENTS

CN 1723451 A 1/2006

OTHER PUBLICATIONS

Wikipedia, "Web Service," article version from Jan. 17, 2005, retrieved from www.wikipedia.org on Jan. 16, 2010.*
Dawkins, Pam, "Ebay Shippers Have Option to Use Patented Pitney Bowes Software to Buy Postage," Knight Ridder Tribune Business News, Washington, Jul. 11, 2004, p. 1.*

(Continued)

*Primary Examiner* — Nathan Erb
(74) *Attorney, Agent, or Firm* — Pillsbury Winthrop Shaw Pittman LLP

(57) ABSTRACT

The present invention is generally directed to online postage services and systems that have an online connection, and more particularly to systems and methods for enabling a shipping label service to be integrated with a third party application or website. One preferred embodiment includes a computer program product having a computer-usable medium with a sequence of instructions, which when executed by a processor, causes the processor to execute a process that provides an online postage and shipping label service. The computer program product is configured to be integrated into a third party application, and the process includes the steps of enabling a user of the third party application to purchase postage, and enabling a user to generate one or more images of one or more shipping labels via the third party application.

33 Claims, 4 Drawing Sheets

(56) References Cited

U.S. PATENT DOCUMENTS

| | | |
|---|---|---|
| 2004/0083179 A1* | 4/2004 | Sesek et al. .................. 705/53 |
| 2005/0065897 A1* | 3/2005 | Ryan et al. .................. 705/401 |
| 2005/0086256 A1* | 4/2005 | Owens et al. ............. 707/103 R |
| 2005/0278266 A1 | 12/2005 | Ogg et al. |
| 2006/0041519 A1* | 2/2006 | Ogg et al. .................. 705/402 |

OTHER PUBLICATIONS

Anonymous, "Letters," PC World, Jun. 2000, pp. 23-24 and 26.*
International Preliminary Examination Report issued on Nov. 28, 2008 in corresponding International Application No. PCT/US07/61063.
Notification of the Second Office Action as issued for Chinese Patent Application No. 200780008832.6, dated Nov. 3, 2011.

* cited by examiner

INTEGRATED POSTAGE AND SHIPPING LABEL SYSTEM

FIELD OF THE INVENTION

The field of the invention relates to online postage services, and more particularly to systems and methods for enabling a shipping label service to be integrated with a third party application or website.

BACKGROUND OF THE INVENTION

Known online postage services, such as Endicia™ Internet Postage, enable computer users to purchase U.S. postage and apply individual postage indicia to a wide spectrum of envelopes and labels using standard computer printers. These systems are based on Information Based Indicia ("IBI"), wherein information to uniquely identify a particular postage indicium, e.g., postage meter account number and meter piece count, is presented in barcode and/or human readable form on each mailpiece. These user-controlled systems have historically focused on producing complete mail pieces, i.e., these systems produce complete envelopes or labels, which contain the destination address, return address, the postage indicium, the date of mailing, the class mail, optional graphics and branding and mail processing barcodes, e.g., POSTNET or Delivery Confirmation.

Turning to FIG. 1, the computer environment in which a user may purchase online postage is shown. A user at a personal computer 11a connects to a server computer 15 configured to enable the user to electronically purchase valid postage, typically via an Internet-type network 20. The user interacts with a software program, e.g., DAZzle by Envelope Manager Software, on the personal computer 11a, downloaded from the server computer 15 and/or installed on the personal computer 11a, that allows the user to manage postage purchases. Systems of purchasing, printing, and generating online postage are described in U.S. Pat. No. 5,319,562 to Whitehouse, filed Aug. 22, 1991, and U.S. Pat. No. 6,005,945 to Whitehouse, filed Mar. 20, 1997, both of which are herein incorporated by reference in their entirety.

Electronic commerce ("e-commerce") is an industry that is contributing to the growth in popularity of online postage services largely because the online postage services can efficiently and cost-effectively support the high volume of transactions that e-commerce companies typically deal with. For example, Endicia™ Internet Postage enables e-commerce sellers to purchase and print a virtually unlimited number of postage and shipping labels upon immediate request, which allows the sellers to rapidly fulfill product orders even at high volume without the need for expensive postage metering hardware.

However, current systems require e-commerce sellers to manage multiple applications, e.g., applications to handle payments and applications to handle postage and shipping, which can create some inefficiencies in operation. Accordingly, an improved online postage service would be desirable.

SUMMARY OF THE INVENTION

The present invention is generally directed to online postage services, and more particularly to systems and methods for enabling a shipping label service to be integrated with a third party application. One preferred embodiment includes a computer program product having a computer-usable medium with a sequence of instructions, which when executed by a processor, causes the processor to execute a process that provides online postage and shipping label services. The computer program product is configured to be integrated into a third party web or desktop application, and the process includes the steps of enabling a user of the third party web or desktop application to purchase postage, and enabling a user to generate one or more images of one or more shipping labels.

Another preferred embodiment is directed to an online postage service that includes a carrier system, such as the USPS, a postage and label server communicatively connected to the carrier system via a secure link, whereby the postage and label server provides postage and label services as web services, and a third party application accessible by an Internet user, whereby said third party application includes computer program code that integrates the postage and label services with the third party application.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the present inventions are obtained, a more particular description of the invention briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

Figure 1:
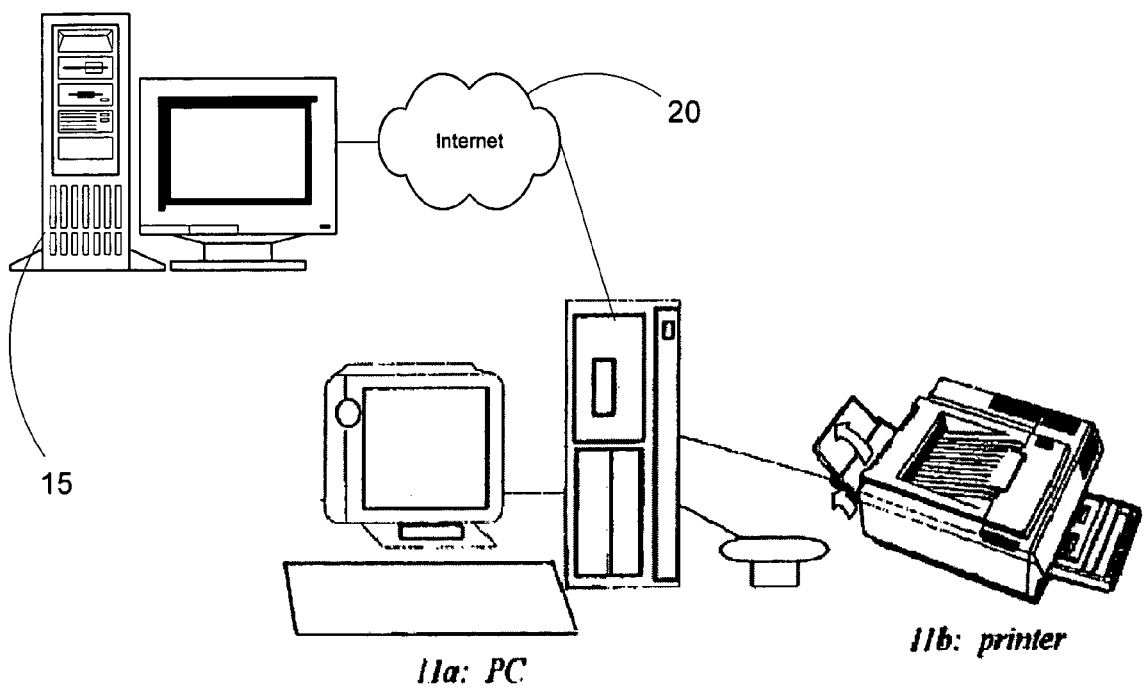
FIG. 1 is an illustration of a prior art online postage service.
Figure 2:
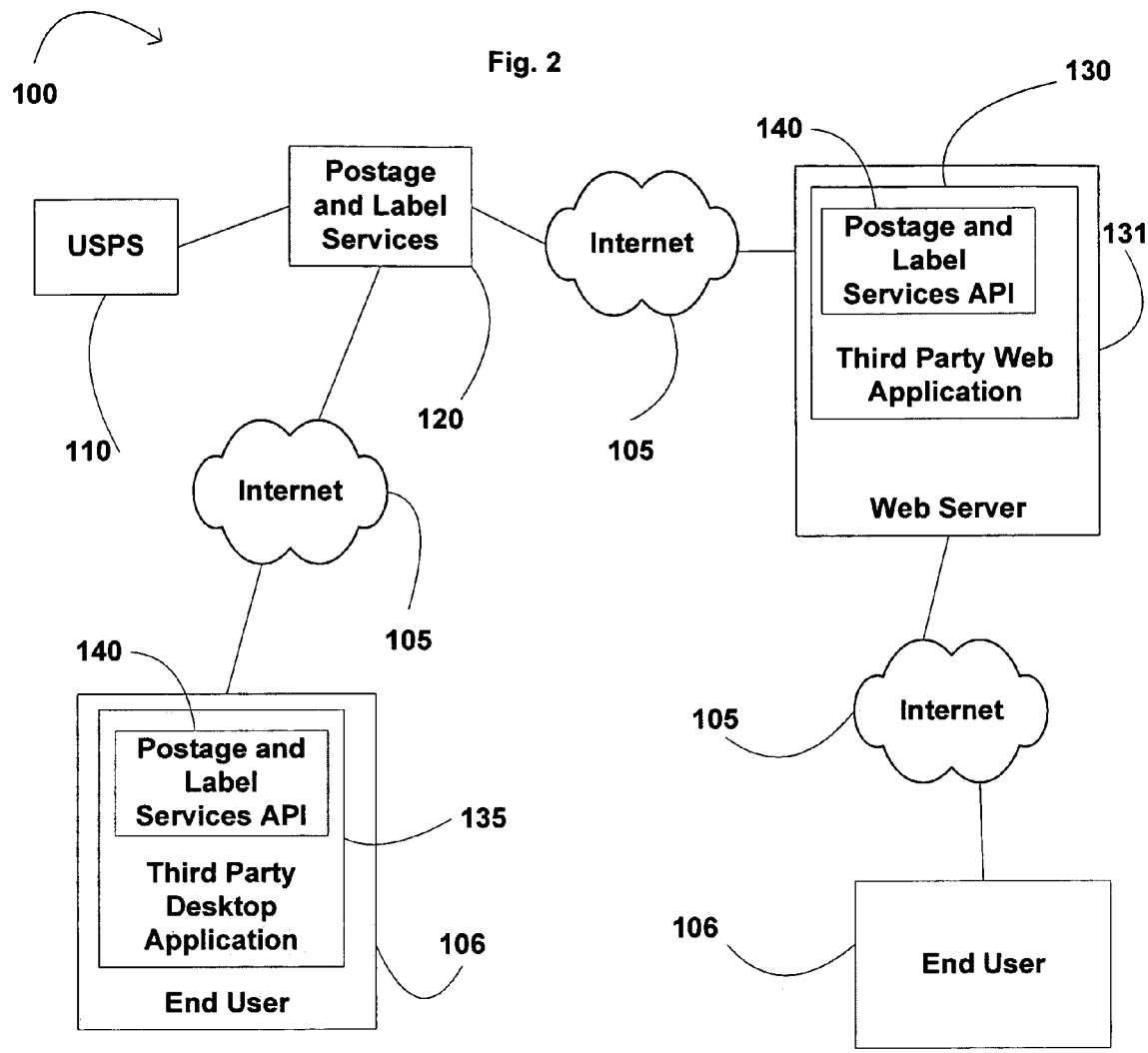
FIG. 2 is a diagram of an online postage service in accordance with a preferred embodiment of the present invention.

Turning to FIG. 2, an online postage service 100 in accordance with a preferred embodiment is shown. For example, as described in U.S. Pat. No. 6,005,945, which was incorporated by reference in its entirety above, and U.S. patent application Ser. No. 09/990,605 to Montgomery et al., filed Nov. 20, 2001, which is also hereby incorporated by reference in its entirety, a postage vendor may generally provide various online postal services that include, among other things, generating and sending self-validating unique postage indicia to end users. Thus, as further described therein, the online postage service 100 includes a postage and label server 120 owned and operated by the postage vendor, wherein the postage and label server 120 provides postage and label services accessible to a plurality of third party applications 130/135 via an application program interface ("API") 140, as will be described in more detail below. The API 140 enables the plurality of third party applications 130/135, such as web applications or websites 130 accessible by an Internet user 106 via a web server 131 and desktop applications 135, i.e., applications residing on a user's 106 desktop, to provide the postage and label services to Internet or desktop Internet-connected users 106 as an integrated part of the third party applications 130/135. The postage and label server 120 is communicatively coupled to a carrier system, such as the United States Postal Service ("USPS") 110 via secure link known in the art and manages postage transactions for the third party applications 130/135. In a preferred embodiment, the network connection between the carrier system 110 and the postage and label server 120 and the postage and label server 120 and the third party applications 130/135 utilizes the Internet 105; however the network connection can use any network technology known in the art, including private networks.

During operation, the Internet user 106 accessing the third party application 130/135 can purchase postage and produce a shipping label image, which can be printed on the Internet user's 106 local printer (not shown) and placed on the package or envelope to be shipped. Postage and shipping services available, via the API 140, to a third party application 130/135 include generating an image of a shipping label, purchasing postage, setting up new postage accounts, and issuing refunds for unused postage purchased.

The postage and label services API 140 is implemented using systems and methods known in the art. For example, the API 140 may be implemented as a Microsoft Windows Dynamic Link Library ("DLL") or component object model ("COM"). In one preferred embodiment, the API 140 is implemented as extensible markup language ("XML") web services, which are invoked using standards based on simple object access protocol ("SOAP") and/or hyper text transfer protocol ("HTTP"), known in the art. This enables a third party application 130/135, such as an e-commerce application to integrate the postage and label services 120 as part of the third party application 130/135. In one aspect of this embodiment, a user 106 of the third party application 130/135 can purchase postage and generate a shipping label as part of the third party application 130/135 without installing new software or change their workflow. An integrated shipping label, complete with postage, delivery/return addresses, and Delivery Confirmation or Express Mail barcodes (in the case of USPS carrier system) can be produced by the third party application using the API 140. This is particularly useful to a variety of applications, such as e-commerce systems, multi-carrier web and desktop shipping systems, browser based environments and applications serving enterprise customers, customer relations management ("CRM") applications, procurement and logistics products, return on demand systems, wherein companies can efficiently process returns on demand, and other applications such as Microsoft's Outlook or QuickBooks as one of ordinary skill in the art will appreciate.

In one example, Amazon's e-commerce system can incorporate the postage and label services 120 into the portions of the website accessible by an auction seller. Upon completion of a transaction for the sale of a product and upon the request of the seller, Amazon's e-commerce system can generate an image of a shipping label to the buyer of the product via the postage and label services API 140 and forward the image to the seller to download, print, and apply to the product for immediate shipment. The postage and label services 120 will appear to the seller as part of the online auction system. In the alternative, the e-commerce system can be configured to generate the appropriate shipping label automatically without the need for the seller's interaction.

For the developer of the third party application 130/135, the postage and label server 120 maintains accounts and manages transactions with the postal service 110. The postage and label server 120 can create and manage a single account associated with the third party application 130/135, in the case where the cost of all shipping labels generated through the web application 130/135 are charged to the single account, or in the alternative, the postage and label server 120 can create and manage multiple accounts associated with the third party application 130/135, which is particularly useful in the case where the third party application 130/135 has the Internet user 106 directly control a postage account through the postage and label server 120.

In one preferred embodiment, the postage and label server 120 manages accounts and transactions with the United States Postal Service ("USPS"). One unique aspect of the USPS 110 compared to other competing carriers is that the postage from the USPS 110 possesses monetary value that, without proper security measures, can be stolen or counterfeited. One security measure known in the art is to generate a postage indicium having an identification unique within USPS that identifies the account associated with the generated postage. Thus, the type of USPS postage generated in accordance with the preferred embodiment of the invention are from mail classes that the USPS can scan and track. This includes all mail classes that include delivery confirmation, such as first class packages, parcel post, media mail, and priority mail, and tracking, such as Express Mail, Global Express Mail, PLANET code tracking, and Global Mail Classes that include Customs Forms scanned by the USPS, such as Global Priority Mail and Global Parcel Post. By using postage that can be tracked, multiple users from multiple locations can use the same postage account with the postage and label server 120.

In the preferred embodiment, systems and methods for generating the unique postage indicia are disclosed and described in U.S. Pat. No. 6,005,945 to Whitehouse, and U.S. patent application Ser. No. 09/990,605, which were incorporated by reference in their entirety above. As noted above, these references describe, among other things, techniques whereby the postage vendor may generate a digital signature incorporated with a postage indicium derived from a combination of items such as account number, serial number, and/or destination address. The digital signature is then encrypted using appropriate private and public keys.

Figure 3:
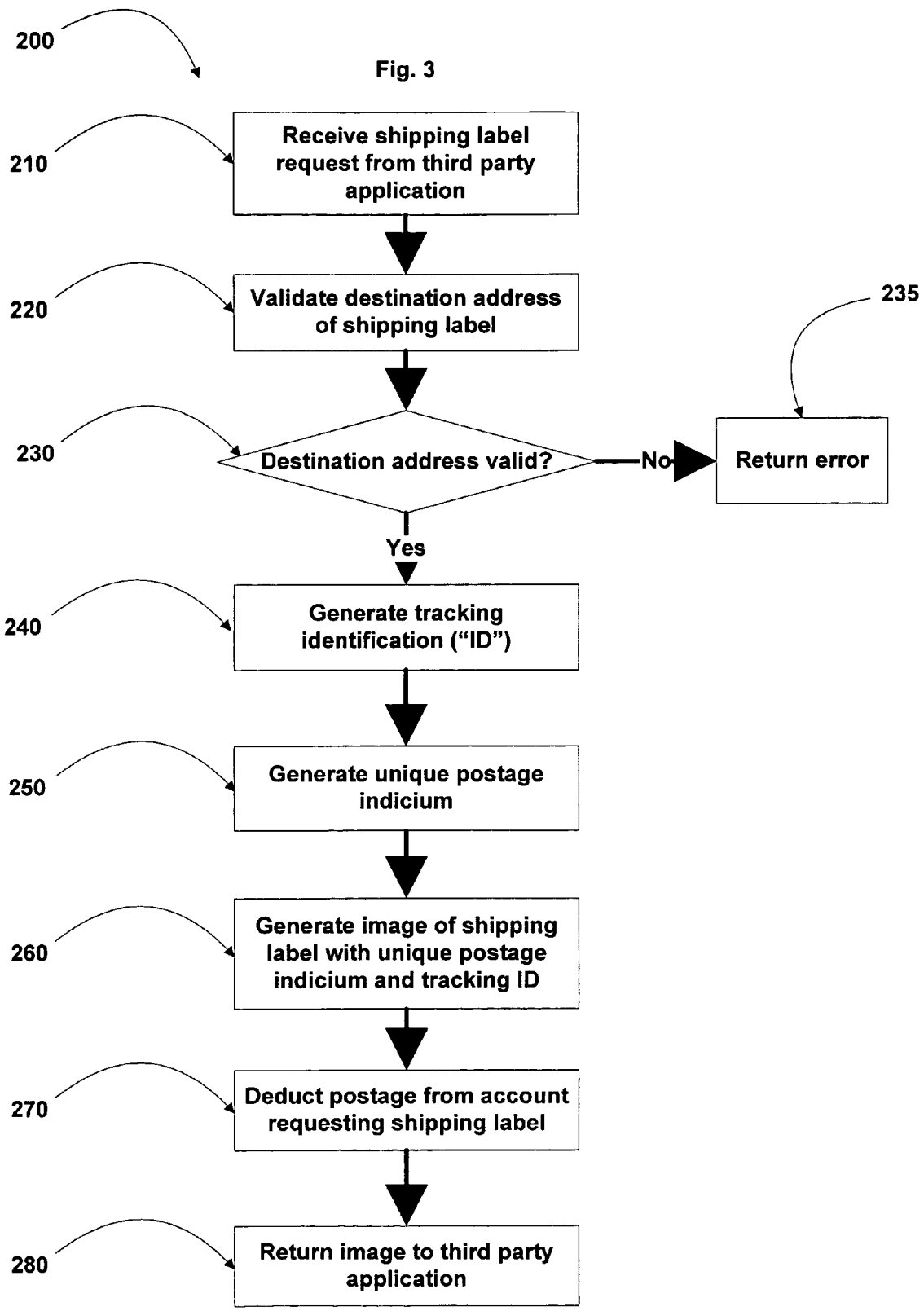
FIG. 3 is an illustration of a process in accordance with a preferred embodiment of the present invention.

Turning to FIG. 3, the operation of a postage and label server 120 (in FIG. 2) coupled via a secure link to the USPS system 110 is shown (process 200). In this process 200, the postage and label services of server 120 is preferably made available as XML web services, and a third party application 130/135 has integrated an interface 140 that invokes the postage and label services upon request from an Internet user 106 accessing the third party application 130/135. An account has been established with the USPS system 110 for the Internet user 106 using systems and methods known in the art. Upon request by the Internet user 110 to generate a shipping label to be placed on a package to be sent to a particular destination address, the third party application 130/135 sends a request to the postage and label server 120, via the API 140, to generate the requested shipping label (action block 210).

The postage and label server 120, in response to the request, validates the destination address of the shipping label (action block 220). The validation uses systems and methods known in the art and generally includes the steps of searching a database of known valid addresses, e.g., a postal database such as the Dial-A-Zip address database, for a street address match; determining whether the city and zip code of the destination address is a match; and determining whether there is a single match in the database, instead of multiple matches. The validation step further determines if the destination address is an Army Post Office ("APO") or Fleet Post Office ("FPO") address, which involve different carrier systems. If the destination address is invalid, (decision block 230), then the postage and shipping label server 120 will return an error to the third party application 130/135 (action block 235). Otherwise, the postage and shipping label server 120 will generate a tracking identification to be associated with the requested shipping label (action block 240) and the postage indicium for the shipping label (action block 250). Thus, in the case of the postage and label server 120 being connected to the USPS, the postage indicium will be unique within the USPS, as described above.

Figure 4:
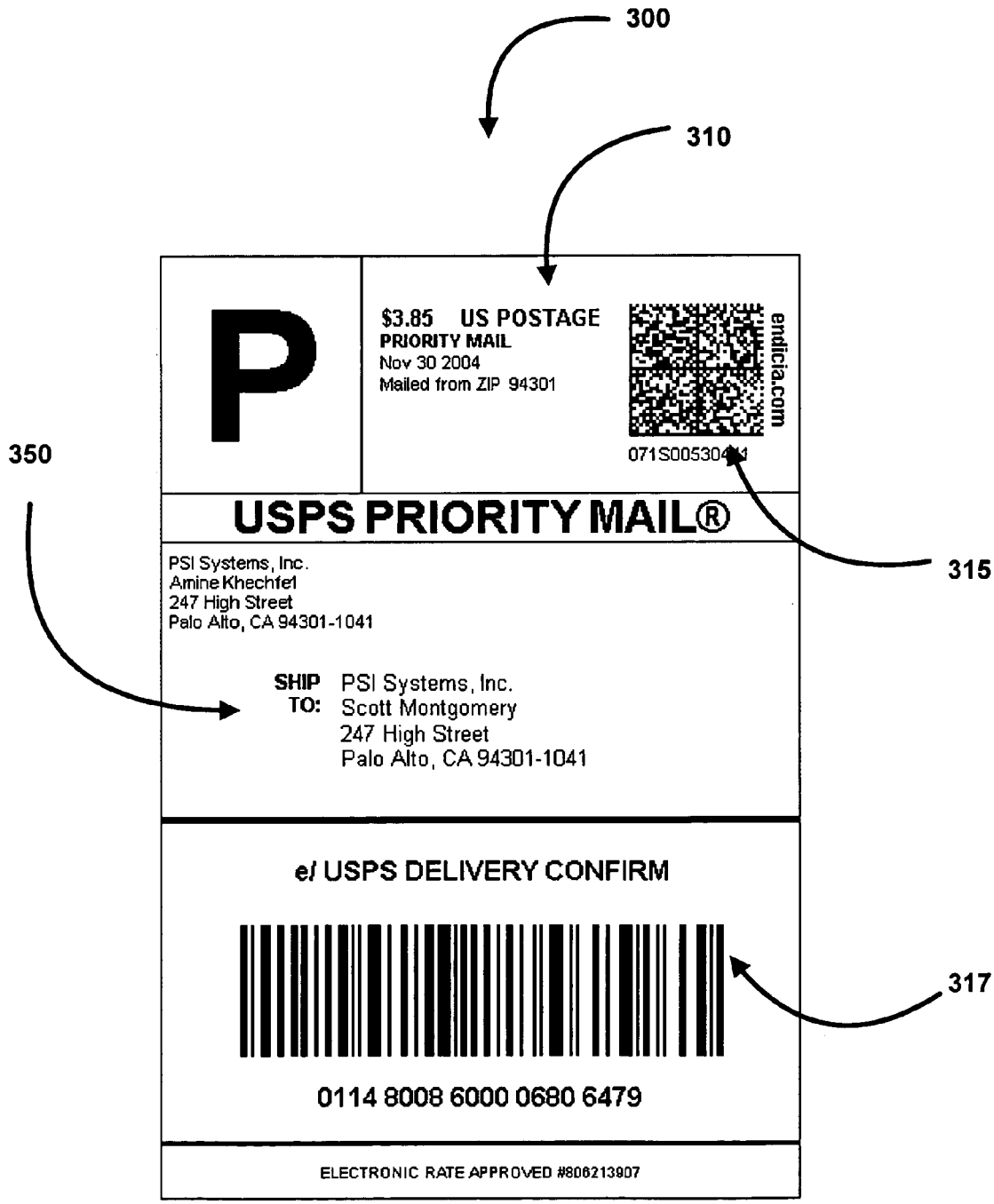
FIG. 4 is an illustration of a shipping label in accordance with a preferred embodiment of the present invention.

The postage and label server 120 will then generate an image of the requested shipping label 300, an example of which is shown in FIG. 4, having the unique postage indicium 310, destination address 350, and tracking identification 317. The indicium 310 includes all of the information discussed in U.S. Pat. No. 5,319,562, incorporated above, some in human readable form and some represented in a PDF-417 or Data-Matrix two dimensional barcode 315. The barcode 315 contains a host of information, including the meter number and a unique serial number for the shipping label 300 of the mail piece, as taught in U.S. Pat. No. 5,319,562. The USPS specifications require use of the PDF417 indicium barcode, or other two dimensional barcodes such as the DataMatrix, as shown in FIG. 4. Some of the data in the barcode are attributable to an attempt to incorporate letter/parcel tracking information, and part is to accommodate an encryption signature and accompanying public key information, which is used in combination to provide a "self-authenticating" feature to the postage indicium 310 and shipping label 300.

The image 300 can be generated using any systems and methods known in the art, such as products from Adobe or products that generate Joint Photographic Experts Group ("JPEG") or graphic interchange format ("GIF") images or other imaging formats known in the art, such as bitmap ("BMP"), portable network graphics ("PNG"), ZPL, or EPL (action block 260). The postage and label server 120 then deducts the cost of the postage for the shipping label 300 from the account associated with the shipping label request (action block 270), and the image 300 is then forwarded to the third party application 130/135 (action block 280), which the third party application 130/135 can make available to the requesting Internet user 106 for download. Any type of shipping labels 300 can be generated, e.g., a simple 6 inch by 4 inch label that can then be printed on popular thermal printers or any normal desktop printer on labels or simple 8.5 inch by 11 inch plain paper or an L-Form shipping label known in the art, wherein the image 300 can be combined into a packing form (not shown) and printed with that combination on a sheet so a worker can walk down to a warehouse, select what needs to ship, pack the box, and then peel off the shipping label part to place on the outside of the box while placing the rest of the sheet in the box as a packing slip. Such a shipping label can be generated for a variety of carrier systems, such as the USPS.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention can be performed using different or additional process actions, or a different combination or ordering of process actions. As a further example, each feature of one embodiment can be mixed and matched with other features shown in other embodiments. Additionally and obviously, features may be added or subtracted as desired. Accordingly, the invention is not to be restricted except in light of the attached claims and their equivalents.

What is claimed is:

1. A method for invoking an online postage and shipping label service provided by a postage vendor on an electronic device that includes a processor, comprising:

providing, by the postage vendor, an application program interface configured to invoke the online postage and shipping label service provided by the postage vendor via a web service, wherein the application program interface limits postage generation to mail classes that a carrier system can scan and track to provide one or more security measures associated with online postage and shipping label service;

receiving, at a postage and label server associated with the postage vendor, an electronic request to generate an image of a shipping label using the online postage and shipping label service from an electronic commerce system, wherein the electronic commerce system integrates the online postage and shipping label service via a third party application having a requester interface that implements the application program interface and invokes the online postage and shipping label service to generate the image of the shipping label;

generating, by the postage and label server, a tracking identification that is associated with the requested image of the shipping label and that is associated with a postage indicium from the mail classes that the carrier system can scan and track on the shipping label;

generating, by the postage and label server, the image of the shipping label on the postage and label server in response to the electronic request received from the electronic commerce system, wherein the image of the shipping label includes a destination address associated with a buyer that completed a transaction on the electronic commerce system, the tracking identification, and the postage indicium;

charging, by the postage and label server, a cost for the shipping label to an account that the postage and label server maintains with the carrier system for the third party application; and sending, from the postage and label server associated with the postage vendor, via extensible markup language (XML) using simple object access protocol (SOAP), the image of the shipping label to the third party application associated with the electronic commerce system via the requester interface that implements the application program interface, wherein the application program interface enables the third party application to integrate the image as part of the third party application and enables the third party application to forward the image of the shipping label to a user associated with the transaction completed on the electronic commerce system, wherein the image is generated in ZPL format or EPL format.

2. The method of claim 1, wherein the account charged the cost for the shipping label comprises one of multiple accounts that the postage and label server maintains with the carrier system for the third party application.

3. The method of claim 1, wherein the carrier system comprises the United States Postal Service.

4. The method of claim 3, wherein the postage and label server communicates with the United States Postal Service over a secure link.

5. The method of claim 1, wherein the postage indicium includes an encryption signature and public key information used in combination to provide a self-authenticating feature to the postage indicium and the shipping label.

6. The method of claim 5, wherein the postage and label server derives the encryption signature from a combination of items that includes the destination address associated with the buyer and the account associated with the third party application.

7. The method of claim 1, further comprising:
determining, by the postage and label server, whether the destination address associated with the buyer is valid or invalid, wherein the postage and label server generates the image of the shipping label in response to determining that the destination address is valid; and
returning an error to the third party application in response to the postage and label server determining that the destination address is invalid.

8. The method of claim 7, wherein determining whether the destination address associated with the buyer is valid or invalid includes the postage and label server searching for the destination address in a postal database having a plurality of known valid addresses.

9. The method of claim 8, wherein the postage and label server determines that the destination address is valid in response to determining that one of the plurality of known valid addresses match a street address included in the destination address and that a city included in the destination address matches a zip code further included in the destination address.

10. The method of claim 8, wherein the postage and label server determines that the destination address is invalid in response to determining that none or more than one of the plurality of known valid addresses match a street address included in the destination address or that a city included in the destination address does not match a zip code further included in the destination address.

11. The method of claim 8, wherein the postage and label server determines that the destination address is invalid in response to determining that one or more of the plurality of known valid addresses that match the destination address is an Army Post Office or a Fleet Post Office.

12. The method of claim 1, wherein the postage and label server communicates with the carrier system to deduct the cost for the shipping label from the account that the postage and label server maintains for the third party application to charge the cost for the shipping label.

13. The method of claim 1, wherein the postage indicium includes one or more of an indicia version number, an algorithm identification, a certificate serial number, a device identification, an ascending register, a postage, a date of mailing, an originating zip code, a software identification, a descending register, or a rate category.

14. The method of claim 1, further comprising:
purchasing, by the invoked online postage and shipping label service, postage to the account associated with the third party application using the invoked online postage and shipping, label service, wherein the invoked online postage and shipping label service communicates with the carrier system to purchase the postage to the account associated with the third party application; and
issuing, by the invoked online postage and shipping label service, a refund to the account associated with the third party application for an unused portion of the postage purchased to the account associated with the third party application.

15. The method of claim 1, wherein the electronic commerce system comprises a website that integrates the online postage and shipping label service into portions of the website that make the third party application accessible to the user.

16. The method of claim 1, wherein the postage indicium includes a tracking identification that identifies the account associated with the third party application.

17. An online postage and shipping label server provided by a postage vendor and communicatively connected to at least one carrier system via a secure link, the online postage and shipping label server configured to perform a method comprising:
providing, by the postage vendor, an application program interface configured to invoke an online postage and shipping label service provided by the postage vendor via a web service, wherein the application program interface limits postage generation to mail classes that a carrier system can scan and track to provide one or more security measures associated with online postage and shipping label service;
receiving, at the online postage and shipping label server, an electronic request to generate an image of a shipping label using the online postage and shipping label service from an electronic commerce system, wherein the electronic commerce system integrates the online postage and shipping label service via a third party application having a requester interface that implements the application program interface and invokes the online postage and shipping label service to generate the image of the shipping label;
generating a tracking identification that is associated with the requested image of the shipping label and that is associated with a postage indicium from the mail classes that the carrier system can scan and track on the shipping label;
generating the image of the shipping label on the online postage and shipping label server in response to the electronic request received from the electronic commerce system, wherein the image of the shipping label includes a destination address associated with a buyer that completed a transaction on the electronic commerce system and the postage indicium;
charging, by the online postage and shipping label server, a cost for the shipping label to an account that the online postage and shipping label server maintains with the carrier system for the third party application; and
sending, from the postage and label server associated with the postage vendor, via extensible markup language (XML) using simple object access protocol (SOAP), the image of the shipping label to the third party application associated with the electronic commerce system via the requester interface that implements the application program interface, wherein the application program interface enables the third party application to integrate the image as part of the third party application and enables the third party application to forward the image of the shipping label to a user associated with the transaction completed on the electronic commerce system, wherein the image is generated in ZPL format or EPL format;
wherein the online postage and shipping label server includes an electronic device having a processor and a memory communicatively coupled to the processor.

18. The online postage and shipping label server of claim 17, wherein the account charged the cost for the shipping label comprises one of multiple accounts that the online postage and shipping label server maintains with the carrier system for the third party application.

19. The online postage and shipping label server of claim 17, wherein the carrier system comprises the United States Postal Service.

20. The online postage and label server of claim 19, wherein the online postage and shipping label server communicates with the United States Postal Service over a secure link.

21. The online postage and shipping label server of claim 17, wherein the postage indicium includes an encryption signature and public key information used in combination to provide a self-authenticating feature to the postage indicium and the shipping label.

22. The online postage and shipping label server of claim 21, wherein online postage and shipping label server derives the encryption signature from a combination of items that includes the destination address associated with the buyer and the account associated with the third party application.

23. The online postage and shipping label server of claim 17, the method further comprising:
  determining, by the postage and shipping label server, whether the destination address associated with the buyer is valid or invalid, wherein the postage and shipping label server generates the image of the shipping label in response to determining that the destination address is valid; and
  returning an error to the third party application in response to the online postage and shipping label server determining that the destination address is invalid.

24. The online postage and label server of claim 23, wherein determining whether the destination address associated with the buyer is valid or invalid includes the postage and label server searching for the destination address in a postal database having a plurality of known valid addresses.

25. The online postage and label server of claim 24, wherein the online postage and shipping label server determines that the destination address is valid in response to determining that one of the plurality of known valid addresses match a street address included in the destination address and that a city included in the destination address matches a zip code further included in the destination address.

26. The online postage and label server of claim 24, wherein the online postage and shipping label server determines that the destination address is invalid in response to determining that none or more than one of the plurality of known valid addresses match a street address included in the destination address or that a city included in the destination address does not match a zip code further included in the destination address.

27. The online postage and label server of claim 24, wherein the online postage and shipping label server determines that the destination address is invalid in response to determining that one or more of the plurality of known valid addresses that match the destination address is an Army Post Office or a Fleet Post Office.

28. The online postage and shipping label server of claim 17, wherein the online postage and shipping label server communicates with the carrier system to deduct the cost for the shipping label from the account that the postage and label server maintains for the third party application to charge the cost for the shipping label.

29. The online postage and shipping label server of claim 17, wherein the postage indicium includes one or more of an indicia version number, an algorithm identification, a certificate serial number, a device identification, an ascending register, a postage, a date of mailing, an originating zip code, a software identification, a descending register, or a rate category.

30. The online postage and shipping label server of claim 17, wherein the electronic commerce system comprises a website that integrates the online postage and shipping label service into portions of the website that make the third party application accessible to the user.

31. The online postage and shipping label server of claim 17, the method further comprising:
  purchasing, by the invoked online postage and shipping label service, postage to the account associated with the third party application using the invoked online postage and shipping label service, wherein the invoked online postage and shipping label service communicates with the carrier system to purchase the postage to the account associated with the third party application; and
  issuing, by the invoked online postage and shipping label service, a refund to the account associated with the third party application for an unused portion of the postage purchased to the account associated with the third party application.

32. The online postage and label server of claim 17, wherein the postage indicium includes a tracking identification that identifies the account associated with the third party application.

33. A non-transitory processor-readable medium communicatively coupled to an online postage and shipping label service provided by a postage vendor, the non-transitory processor-readable medium having a sequence of instructions which, when executed on a processor, causes the processor to perform a method comprising:
  providing, by the postage vendor, an application program interface configured to invoke the online postage and shipping label service provided by the postage vendor via a web service, wherein the application program interface limits postage generation to mail classes that a carrier system can scan and track to provide one or more security measures associated with online postage and shipping label service;
  receiving, at a postage and label server associated with the postage vendor, an electronic request to generate an image of a shipping label using the online postage and shipping label service from an electronic commerce system, wherein the electronic commerce system integrates the online postage and shipping label service via a third party application having a requester interface that implements the application program interface and invokes the online postage and shipping label service to generate the image of the shipping label;
  generating a tracking identification that is associated with the requested image of the shipping label and that is associated with a postage indicium from the mail classes that the carrier system can scan and track on the shipping label;
  generating the image of the shipping label on the postage and label server in response to the electronic request received from the electronic commerce system, wherein the image of the shipping label includes a destination address associated with a buyer that completed a transaction on the electronic commerce system and the postage indicium;

charging, by the postage and label server, a cost for the shipping label to an account that the postage and label server maintains with the carrier system for the third party application; and sending, from the postage and label server associated with the postage vendor, via extensible markup language (XML) using simple object access protocol (SOAP), the image of the shipping label to the third party application associated with the electronic commerce system via the requester interface that implements the application program interface, wherein the application program interface enables the third party application to integrate the image as part of the third party application and enables the third party application to forward the image of the shipping label to a user associated with the transaction completed on the electronic commerce system, wherein the image is generated in ZPL format or EPL format.

* * * * *